US010710159B2

(12) United States Patent
Corsmeier

(10) Patent No.: US 10,710,159 B2
(45) Date of Patent: Jul. 14, 2020

(54) APPARATUS AND METHOD FOR ADDITIVE MANUFACTURING WITH REAL-TIME AND IN-SITU ADJUSTMENT OF GROWTH PARAMETERS

(71) Applicant: GENERAL ELECTRIC COMPANY, Schenectady, NY (US)

(72) Inventor: Donald Michael Corsmeier, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 193 days.

(21) Appl. No.: 15/697,007

(22) Filed: Sep. 6, 2017

(65) Prior Publication Data

US 2019/0070663 A1 Mar. 7, 2019

(51) Int. Cl.
*B22F 3/105* (2006.01)
*B33Y 10/00* (2015.01)
(Continued)

(52) U.S. Cl.
CPC ........ *B22F 3/1055* (2013.01); *B23K 26/0626* (2013.01); *B23K 26/144* (2015.10);
(Continued)

(58) Field of Classification Search
CPC .................................................. B22F 3/1055
See application file for complete search history.

(56) References Cited

U.S. PATENT DOCUMENTS 5,306,447 A 4/1994 Marcus et al.
6,046,426 A 4/2000 Jeantette et al.
(Continued)

FOREIGN PATENT DOCUMENTS

DE 102015225757 A1 6/2017
EP 3106288 A1 12/2016
(Continued)

OTHER PUBLICATIONS

Mani, M., Feng, S., Lane, B., Donmez, A., Moylan, S., & Fesperman, R. (2015). Measurement science needs for real-time control of additive manufacturing powder bed fusion processes. (Year: 2015).*
(Continued)

*Primary Examiner* — Anthony J Zimmer
*Assistant Examiner* — Ricardo D Morales
(74) *Attorney, Agent, or Firm* — Dinsmore & Shohl LLP

(57) ABSTRACT

An apparatus for powder-based additive manufacturing of an object is provided. The apparatus includes a powder delivery mechanism, a powder recoating mechanism, an irradiation beam directing mechanism and a temperature control mechanism that at least measures a real-time temperature of at least one growing part of a built object. The apparatus includes a build unit, a positioning mechanism, and a rotating mechanism. The build unit attaches to the positioning mechanism providing the build unit with independent movements in at least two dimensions. The build unit also attaches to the rotating mechanism and rotates around and above a build platform during production. A method of manufacturing the object using the apparatus includes repetitive cycles of depositing powder onto a build platform, irradiating at least one selected portion of the powder to form at least one fused layer, and measuring a real-time temperature of at least one selected portion of the at least one fused layer.

20 Claims, 8 Drawing Sheets

(51) Int. Cl.
| | |
|---|---|
| *B33Y 30/00* | (2015.01) |
| *B33Y 50/02* | (2015.01) |
| *B23K 26/342* | (2014.01) |
| *B23K 26/06* | (2014.01) |
| *B23K 26/144* | (2014.01) |
| *B29C 64/393* | (2017.01) |
| *B29C 64/153* | (2017.01) |
| *B29C 64/241* | (2017.01) |
| *B29C 64/268* | (2017.01) |

(52) U.S. Cl.
CPC .......... *B23K 26/342* (2015.10); *B29C 64/153* (2017.08); *B29C 64/241* (2017.08); *B29C 64/268* (2017.08); *B29C 64/393* (2017.08); *B33Y 10/00* (2014.12); *B33Y 30/00* (2014.12); *B33Y 50/02* (2014.12); *B22F 2003/1056* (2013.01); *B22F 2003/1057* (2013.01)

(56) References Cited

U.S. PATENT DOCUMENTS

| | | | |
|---|---|---|---|
| 6,459,951 | B1 | 10/2002 | Griffith et al. |
| 6,676,892 | B2 | 1/2004 | Das et al. |
| 9,228,980 | B2 | 1/2016 | Singh et al. |
| 9,321,215 | B2* | 4/2016 | Dudley ............ B33Y 10/00 |
| 9,415,438 | B2 | 8/2016 | McBrien et al. |
| 2006/0108712 | A1 | 5/2006 | Mattes |
| 2016/0288207 | A1 | 10/2016 | Gambardella et al. |
| 2016/0368050 | A1 | 12/2016 | Morris et al. |
| 2017/0021572 | A1 | 1/2017 | Wiesner et al. |
| 2017/0051386 | A1 | 2/2017 | Carter et al. |
| 2017/0190112 | A1* | 7/2017 | Thorson ............ B33Y 30/00 |
| 2017/0239719 | A1* | 8/2017 | Buller ............ B33Y 40/00 |
| 2017/0239721 | A1 | 8/2017 | Buller et al. |

FOREIGN PATENT DOCUMENTS

| | | |
|---|---|---|
| JP | 2004306612 A | 11/2004 |
| WO | 2017085468 A1 | 5/2017 |
| WO | WO2018/111240 A1 | 6/2018 |

OTHER PUBLICATIONS

Extended European Search Report Corresponding to Application No. 18190271.9 dated Feb. 27, 2019.

* cited by examiner

APPARATUS AND METHOD FOR ADDITIVE MANUFACTURING WITH REAL-TIME AND IN-SITU ADJUSTMENT OF GROWTH PARAMETERS

INTRODUCTION

The present disclosure generally relates to additive manufacturing apparatuses and methods. More specifically, the present disclosure relates to apparatuses and methods that enable a real-temperature of a growing part of a built object to be measured, determined and adjusted accordingly such that the part may cool and solidify to the correct or desired size.

BACKGROUND

Additive manufacturing (AM) encompasses a variety of technologies for producing components in an additive, layer-wise fashion. In powder bed fusion which is one of the most popular AM technologies, a focused energy beam is used to fuse powder particles together on a layer-wise basis. The energy beam may be either an electron beam or laser. Laser powder bed fusion processes are referred to in the industry by many different names, the most common of which being selective laser sintering (SLS) and selective laser melting (SLM), depending on the nature of the powder fusion process. When the powder to be fused is metal, the terms direct metal laser sintering (DMLS) and direct metal laser melting (DMLM) are commonly used.

Referring to FIG. 1, a laser powder bed fusion system such as system 100 includes a fixed and enclosed build chamber 101. Inside the build chamber 101 is a build plate 102 and an adjacent feed powder reservoir 103 at one end and an excess powder receptacle 104 at the other end. During production, an elevator 105 in the feed powder reservoir 103 lifts a prescribed dose of powder to be spread across a build surface defined by the build plate 102 using a recoater blade 106. Powder overflow is collected in the powder receptacle 104, and optionally treated to sieve out rough particles before re-use.

Selected portions 107 of the powder layer are irradiated in each layer using, for example, laser beam 108, thereby creating a melt pool. After irradiation, the build plate 102 is lowered by a distance equal to one layer thickness in the object 109 being built. A subsequent layer of powder is then coated over the last layer and the process repeated until the object 109 is complete. The laser beam 108 movement is controlled using galvo scanner 110. The selective irradiation is conducted in a manner to build the object 109 in accordance with computer-aided design (CAD) data.

Powder bed technologies have demonstrated the best resolution capabilities of all known metal AM technologies. However, especially with large objects, parameters of the manufacturing process, e.g. the intensity, speed or duration of the irradiation beam, need to be efficiently controlled in order to produce such large objects having multiple parts of varying sizes, geometries or configurations.

In some instances, beyond or alternative to control of the irradiation beam parameters, the temperature of the melt pool in the powder bed may be controlled. For example, US 2017/0051386 (assigned to General Electric Company) describes a manufacturing method where a substrate positioned on a base plate is heated to a predetermined temperature using a first heater, then a melt pool is formed using a laser on a surface of the substrate. A superalloy powder is introduced to the melt pool and the temperature of the melt pool is measured then adjusted accordingly.

However, changing thermal states of the melt pool in the powder bed over the course of a build process can result in thermally-driven deviations of the cross section of the part being built relative to the "baseline" of the built object, i.e., the reference baseline position. If uncompensated, this thermal play between the built object and the apparatus can result in small dimensional errors in size and position relative to what is most desirable.

In view of the foregoing, there remains a need for manufacturing apparatuses and methods that can handle production of objects, especially objects having multiple parts of varying sizes, geometries or configurations, with improved precision and in a manner that is both time- and cost-efficient with a minimal waste of raw materials.

SUMMARY OF THE INVENTION

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

The foregoing and/or aspects of the present invention may be achieved by an additive manufacturing apparatus for building an object. In an aspect, the apparatus includes a powder dispenser, an irradiation source, a platform on which the object is built in a powder bed, a recoater providing layers of powder over the platform, and a controller configured to measure a real-time temperature of a growing part of the object as the object is built.

The foregoing and/or aspects of the present invention may be achieved by an additive manufacturing apparatus for building an object. In an aspect, the apparatus includes a build unit including a powder delivery mechanism, a recoater, an irradiation source and a temperature control mechanism configured to measure a real-time temperature of a growing part of the object as the object is built. The apparatus also includes a build platform and a rotating mechanism attached to the build unit and capable of rotating about a center axis thereof relative to the build unit.

The foregoing and/or aspects of the present invention may be achieved by a method of manufacturing an object by additive manufacturing. In an aspect, the method includes (a) depositing a given layer of powder onto a build platform in a powder bed; (b) fusing the given layer of powder in the powder bed to form a given fused region; (c) measuring a real-time temperature of the fused layer of powder; (d) depositing a subsequent layer of powder; and (d) repeating steps (a) through (d) until the object is formed in the powder bed.

DETAILED DESCRIPTION

Figure 1:
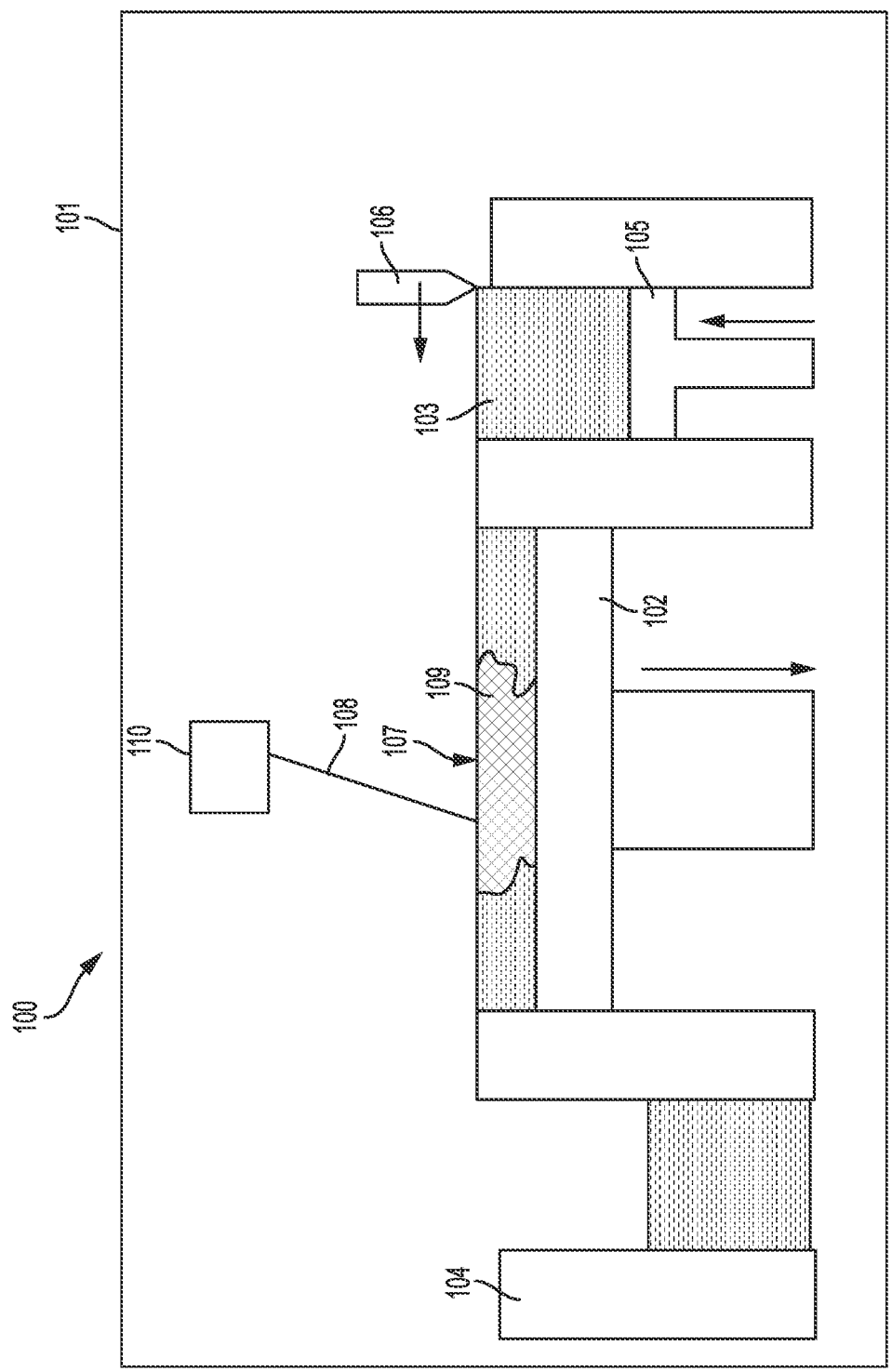
FIG. 1 shows an exemplary prior art powder bed based system for additive manufacturing.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. For example, the present invention provides a preferred method for additively manufacturing metallic components or objects, and preferably these components or objects are used in the manufacture of jet aircraft engines. In particular, large components of jet aircraft engines can be advantageously produced in accordance with this invention, including annular components with varying diameters. However, other components of an aircraft and other non-aircraft components may be prepared using the apparatuses and methods described herein.

The present invention provides an additive manufacturing apparatus and embodiments of the apparatus that can be used to perform powder bed based additive manufacturing, including but not limited to selective laser sintering (SLS), selective laser melting (SLM), direct metal laser sintering (DMLS), direct metal laser melting (DMLM) and electron beam melting (EBM) processes. The present invention also includes methods for utilizing the apparatus or an embodiment thereof to additively manufacture objects. The apparatuses of the present invention includes a temperature control mechanism that enables the real-time temperature of a growing part of the built object to be measured in order to determine the practical regional bulk temperature of the growing part. This local bulk temperature is measured and determined so that when the irradiation is completed, the grown part may cool to the correct size. Currently, each individual part of a built object may be grown to a size based on calculated computer-aided design (CAD) data, and the effects of the temperature of the growing part may be learned only through manufacturing trials and inspection. The apparatuses and methods of the present invention could be especially useful for the additive manufacturing of large, annular objects of varying cross-sectional thickness or diameter, where global and local part distortions have not yet been determined by manufacturing trials and post-manufacturing analyses. Examples of these substantially annular or cylindrical objects may be annular or cylindrical components of an aircraft engine or an aircraft. Examples of such aircraft components may be turbine or vane shroudings, central engine shaft, casings, compressor liners, combustor liners, ducts, etc. In some instances, these components may have a radius of up to 2 meter. Additionally, multiple smaller objects may be arranged appropriately on the build platform to be simultaneously built. Essentially, the apparatuses and methods described herein represent a step forward in connecting the dots between the surrogate machine process and the spawning of a built component with end specifications precisely matching the application.

According to an aspect, the present invention may measure real-time temperature of a growing part and subsequently use the measured real-time temperature to calculate a current real-time part size. As such, the apparatus may be configured with a processor to provide grow parameters of the growing part that may be adjusted based on the current real-time part size and a laser scanner instructed accordingly to grow the part a real-time size of the part.

In yet another aspect, the present invention may be capable of real-time thermal characterization of a powder bed in which the part is built to provide for thermally driven build compensation. As well, the present invention may be configured with machine analytics to assess the impact of a powder bed thermal state on baseline model dimensions and build parameter real-time compensation using machine controllers and system feedback.

Preferably, an additive manufacturing apparatus provided herein includes a mobile build unit assembly, which may be configured to include several components essential for additively manufacturing high-precision objects. These build components include, for example, a powder delivery mechanism, a powder recoating mechanism, an irradiation beam directing mechanism and temperature sensor. In certain embodiments, the build unit may be advantageously attached to a positioning mechanism that allows two- or three-dimensional movement (along x-, y- and z-axes) throughout the build environment, as well as rotation of the build unit in a way that allows leveling of the powder in any direction desired. The positioning mechanism may be a gantry, a delta robot, a cable robot, a robotic arm, a belt drive, or the like. In alternative embodiments, the build unit is advantageously attached to a rotating mechanism that allows rotational movement of the build unit around a center rotation.

An additive manufacturing apparatus provided herein also includes a build platform or powder bed that may be vary in configuration and size. For instance, the build platform may assume a conventional rectangular shape. Alternatively, the build platform may be annular. A build platform in accordance with the present invention may be vertically stationary or vertically movable. A build platform of the present invention may also be rotating or non-rotating. In a particular embodiment, the rotating mechanism may be preferably concentric with an annular build platform, and positions the build unit above and suitably substantially parallel to the build platform. The rotating mechanism rotationally moves the build unit above and suitably substantially parallel to the build platform to simultaneously level powder and melt powder to form a fused layer of the build object at one or more build areas within the build platform. In some embodiments, the rotating mechanism may be attached and supported onto a central, erect tower which may also be preferably concentric with the non-rotating annular build platform.

As used herein, the term "mechanism" refers to a structural entity that is either a single device or instrument, a single device or instrument having multiple components, or a system of multiple, distinct devices or instruments. The term "mechanism" is used interchangeably with the term "unit", which bears the same definition as set forth in the foregoing sentence.

Figure 2:
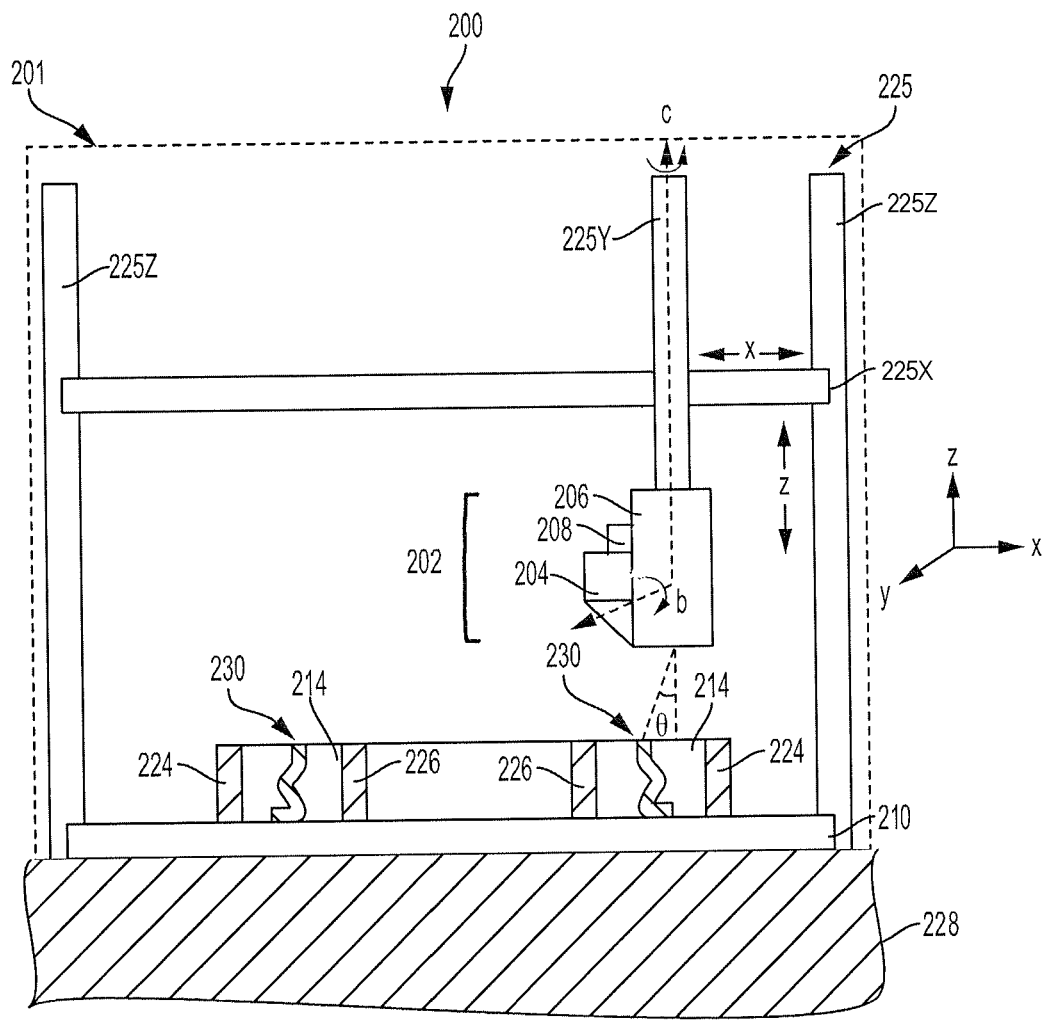
FIG. 2 is a schematic diagram showing a front view showing a cross section of an additive manufacturing apparatus according to an embodiment of the invention.

FIG. 2 depicts a schematic representation of an additive manufacturing apparatus 200 according to an embodiment of the present invention. The apparatus 200 may include a build enclosure 201 housing the entire apparatus 200 and object 230 to be built. The apparatus 200 includes a build unit 202 and a build platform 210. During operation, the apparatus builds an object 230 in a powder bed 214 formed between an outer build envelope 224 and, in many cases, an inner build envelope 226. However, it should be noted that an object may be built without any inner or outer build envelope. The purpose of such build envelopes is to retain unfused powder to avoid spillover and wastage.

The build unit 202 may be configured to include several components for additively manufacturing a high-precision, large-scale object or multiple smaller objects. A mobile build unit 202 may include, for example, a powder delivery and recoating mechanism 204, and an irradiation beam directing mechanism 206. Additional details of an exemplary mobile build unit to be used in accordance with an embodiment of the present invention are described below with reference to FIG. 4.

As illustrated in FIG. 2, a positioning mechanism 225 may be an X-Y-Z gantry having one or more x-crossbeams 225X (one shown in FIG. 2) that independently move the build unit 202 along the x-axis (i.e., left or right), one or more y-crossbeams 225Y (one shown in FIG. 2) that respectively move the build unit 202 along the y-axis (i.e. inward or outward). Such two-dimensional movements across the x-y plane may be substantially parallel to the build platform 210 or a build area therewithin. Additionally, the positioning mechanism 225 has one or more z-crossbeams 225Z (two shown in FIG. 2) that move the build unit 202 along the z-axis (i.e. upward and downward or substantially perpendicular to the build platform 210 or a build area therewithin). The positioning mechanism 225 may be further operable to rotate the build unit 202 around the c-axis and also the b-axis.

Figure 3:
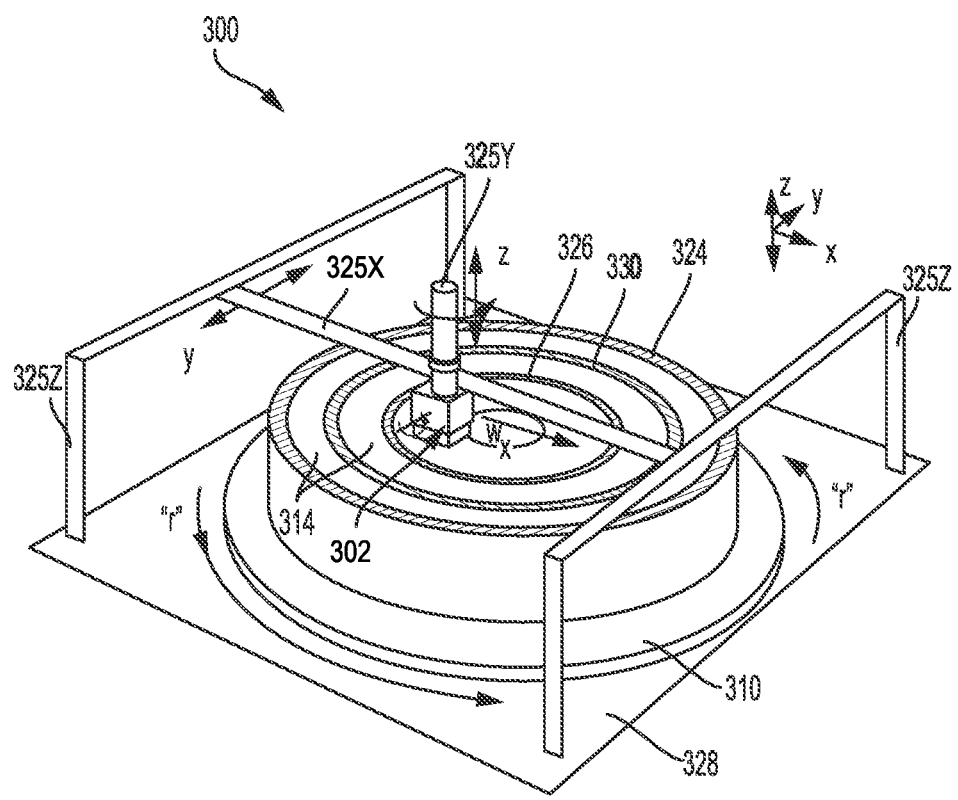
FIG. 3 is a perspective view of an additive manufacturing apparatus in accordance with another embodiment of the invention.

FIG. 3 shows an additive manufacturing apparatus 300 in accordance with another aspect of the present invention, where the apparatus 300 has a rotating build platform 310. The build unit 302 is attached to a gantry having "z" crossbeams 325Y, "x" crossbeam 325X and "y" crossbeam 325Y (partially shown). The build unit 202 can be rotated in the x-y plane as well as the z-plane as shown by the curved arrows "r" in FIG. 3. The object being built 330 on the rotating build platform 310 is shown in a powder bed 314 constrained by an outer build wall 324 and an inner build wall 326. The rotating build platform 310 may be further secured to a stationary support structure 328.

Figure 4:
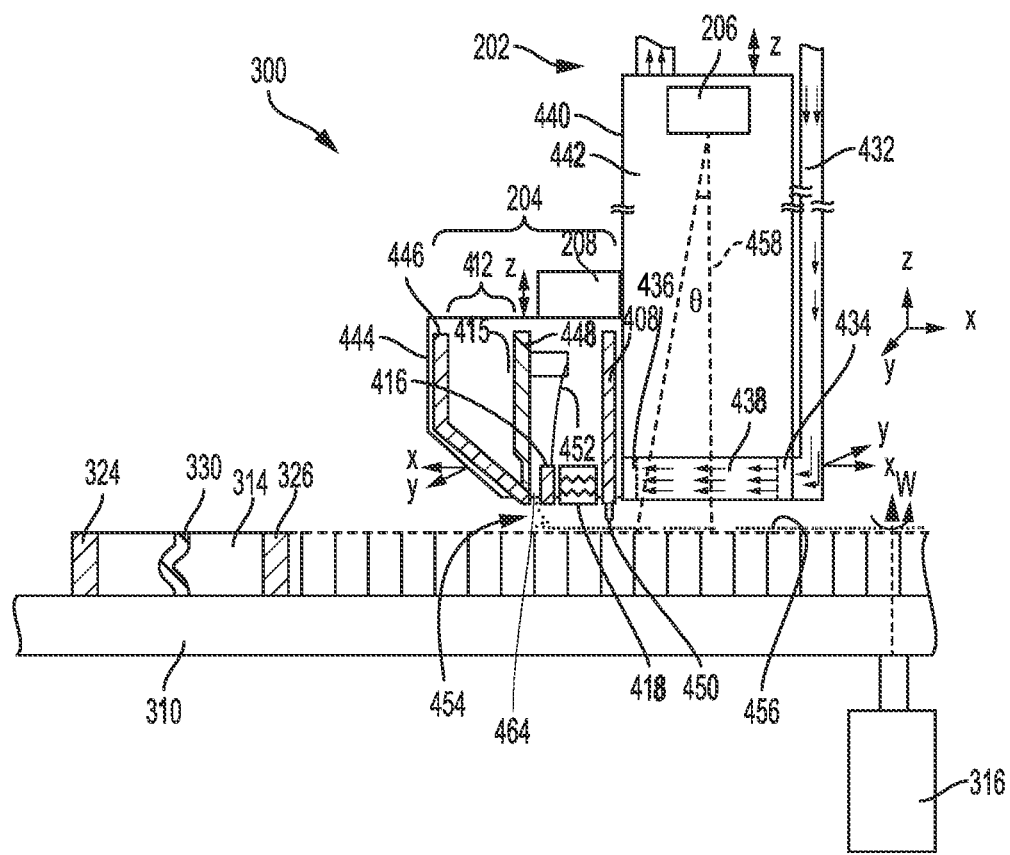
FIG. 4 is an expanded cross section of a build unit and part of the rotating build platform of the additive manufacturing apparatus of FIG. 2.

FIG. 4 shows a side view of an additive manufacturing apparatus 300 according to an embodiment of the present invention. It should be noted that some of the reference numbers in FIGS. 2 and 3 are used to describe various elements in FIG. 4. That is, FIG. 4 illustrates the apparatus 300 configured with the build unit 202 at a right side of the rotating build platform 310. The build unit 202 includes an irradiation beam directing mechanism 206, a gas-flow mechanism 432 with a gas inlet 434 and gas outlet 436 providing gas flow to a gas flow zone 438, a powder delivery and recoating mechanism 204, and a temperature control mechanism 208. Positioned above the gas flow zone 438, may be provided an enclosure 440 containing an inert environment 442. The powder delivery and recoating mechanism 404 mounted on a recoater plate 444, may be provided with a powder dispenser 412 that includes a back plate 446 and a front plate 448. The powder delivery and recoating mechanism 204 also includes at least one actuating element 452, at least one gate plate 416, a recoater blade 450, an actuator 418 and a recoater arm 408. In this embodiment, the actuator 418 activates the actuating element 452 to pull the gate plate 416 away from the front plate 448, as shown in FIG. 4. There is also a gap 464 between the front plate 448 and the gate plate 416 that allows the powder to flow onto the rotating build platform 310 when the gate plate 416 is pulled away from the front plate 448 by the actuating element 452.

FIG. 4 shows the build unit 202 with the gate plate 416 at an open position. The powder 415 in the powder dispenser 412 may be deposited to make a fresh layer of powder 454, which is smoothed over a portion of the top surface (i.e. build or work surface) of the rotating build platform 310 by the recoater blade 450 to make a substantially even powder layer 456 which is then irradiated by the irradiation beam 458 to a fused layer of be part of the printed object 330. Alternatively, the substantially even powder layer 456 may be irradiated at the same time as the build unit 202 moves, allowing for a continuous operation of the build unit 202 and hence, a more time-efficient production of the printed or grown object 330. As shown in FIG. 4, the object 330 being built on the rotating build platform 310 in the powder bed 314 may be constrained by an outer build wall 324 and an inner build wall 326.

As shown in FIGS. 3 and 4, the rotating build platform 310 may be a rigid and ring-shaped or annular structure (i.e. with an inner central hole) configured to rotate 360° around the center of rotation W. The rotating build platform 310 may be secured to an end mount of a motor 316 operable to selectively rotate the rotating build platform 310 around the center of rotation W such that the build platform 310 moves in a circular path. The motor 316 may be further secured to a stationary support structure 328. Alternatively, the motor may also be located elsewhere near the apparatus and mechanically connected with the build platform via a belt for translating motion of the motor to the build platform.

As shown in FIG. 4, the temperature control mechanism 208 may be attached to the powder delivery and recoating mechanism 204 and away from the irradiation beam directing mechanism 206. According to an aspect, the present invention, for example, advantageously and strategically imposes some distance between the irradiation beam directing mechanism 206 and the temperature control mechanism 208 to ensure that the temperature control mechanism 208 measures the real-time temperature of a growing part of the built object (i.e. post-irradiation by the irradiation beam directing mechanism to form a fused layer and prior to cooling and solidification of the fused layer) instead of the melt pool. For instance, it may be desirable that the irradiation beam directing mechanism 206 and the temperature control mechanism 208 are at least 15 cm apart from each other, e.g. 15-60 cm, preferably 20-60 cm and 30-60 cm, more preferably 30-50 cm, 30-45 cm, 30-40 cm, 15-40 cm, 15-30 cm, 20-30 cm, 15-20 cm.

In other exemplary embodiments, the apparatuses 200 and 300 may incorporate features and elements disclosed in one or more of the Applicant's co-pending application Ser. No. 15/610,177 (Apparatus and method for angular and rotational additive manufacturing); Ser. No. 15/609,909 (Apparatus and method for real-time simultaneous additive and subtractive manufacturing); Ser. No. 15/610,113 (Method for real-time simultaneous additive and subtractive manufacturing with a dynamically grown build wall); Ser. No. 15/610,214 (Method for real-time simultaneous and calibrated additive and subtractive manufacturing); and Ser. No. 15/609,747 (Apparatus and method for real-time simultaneous additive and subtractive manufacturing with mechanism to recover unused raw material). Each of these applications is incorporated herein by reference in its entirety.

Representative examples of suitable powder materials that may be used in an additive manufacturing process of the present invention can include metallic alloy, polymer, or ceramic powders. Exemplary metallic powder materials may be stainless steel alloys, cobalt-chrome, aluminum alloys, titanium alloys, nickel based superalloys, and cobalt based superalloys. In addition, suitable alloys may include those that have been engineered to have good oxidation resistance, known "superalloys" which have acceptable strength at the elevated temperatures of operation in a gas turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-750, ECY 768, 282, X45, PWA 1483 and CMSX (e.g. CMSX-4) single crystal alloys. The manufactured objects of the present invention may be formed with one or more selected crystalline microstructures, such as directionally solidified ("DS") or single-crystal ("SX").

Figure 5A:
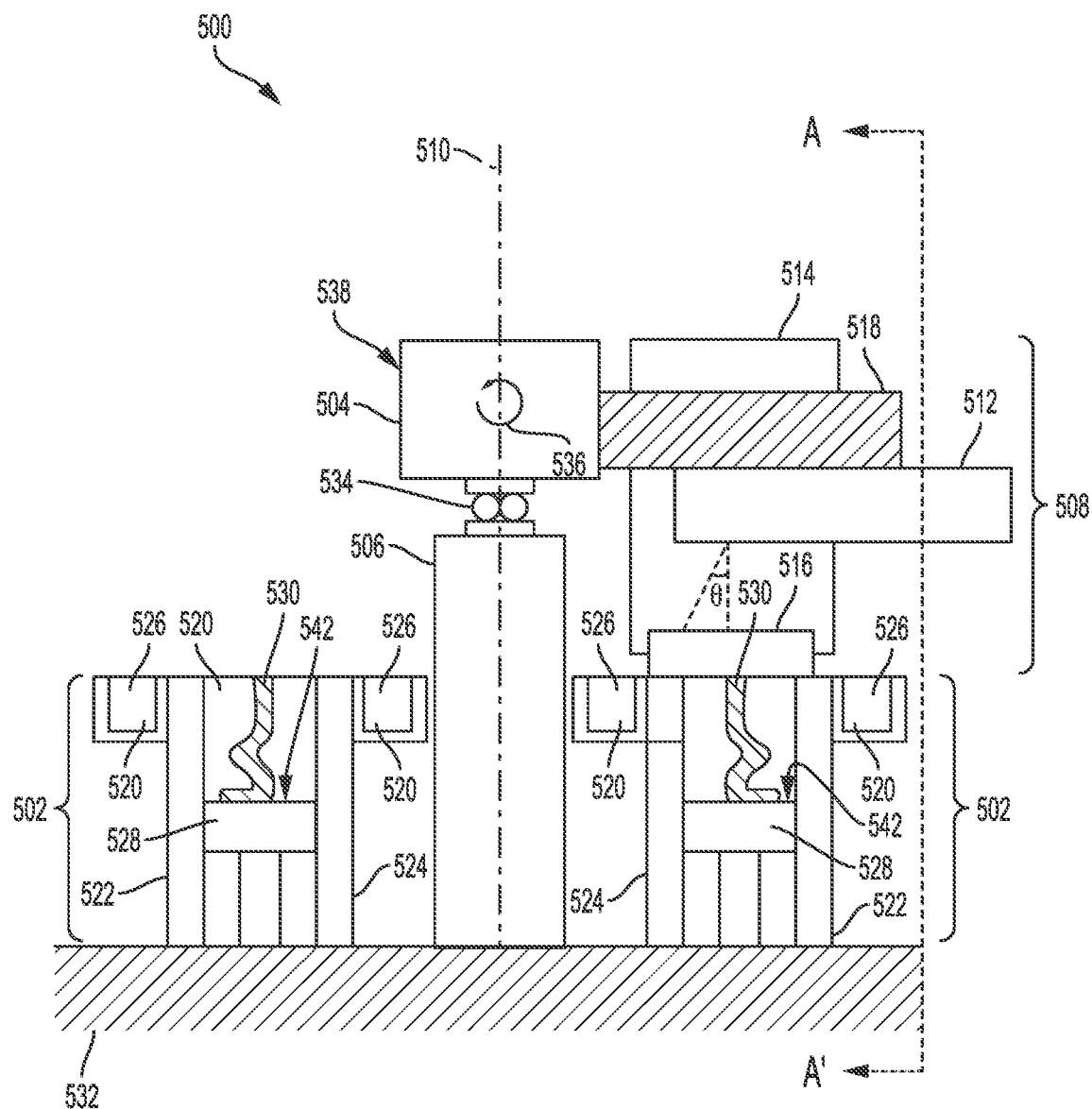
FIG. 5A is a schematic front cross-sectional view of an additive manufacturing apparatus according to yet another embodiment of the present invention with an annular powder bed and a mechanism that rotates the build unit.
Figure 5B:
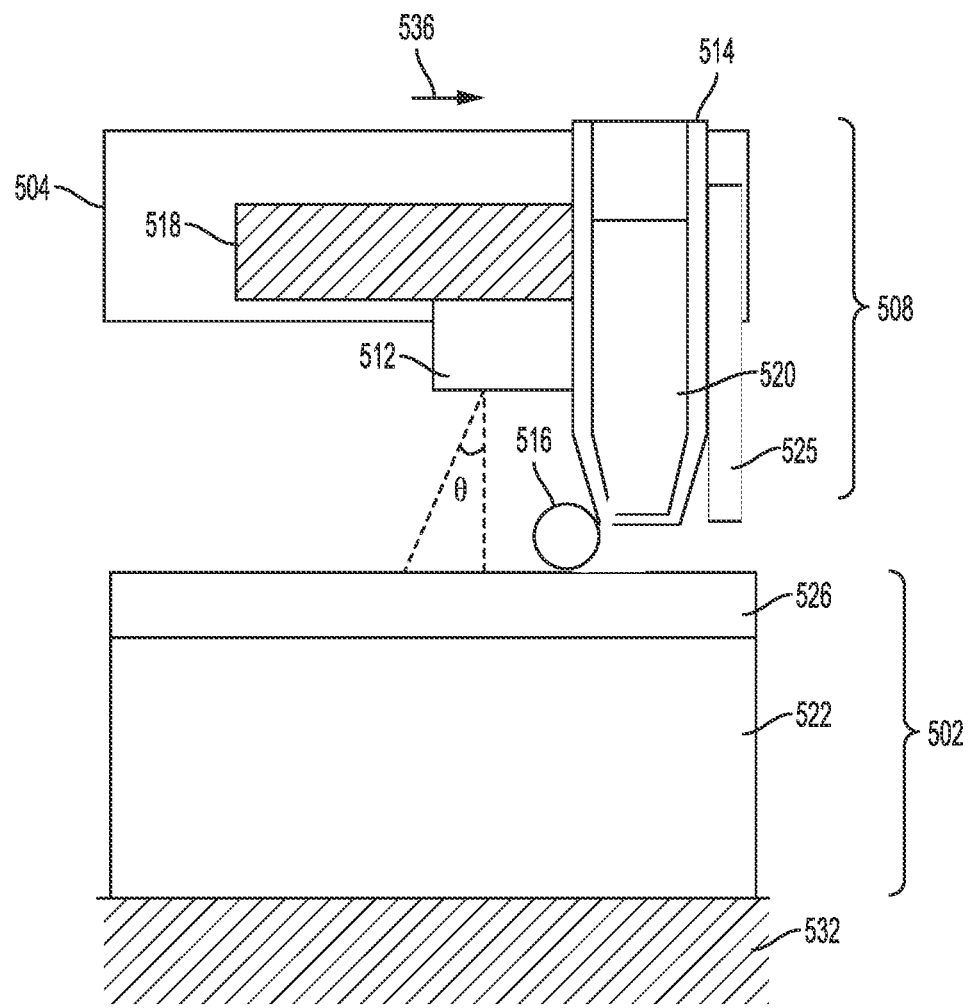
FIG. 5B is a A-A' side cross-sectional view of the large-scale additive manufacturing apparatus of FIG. 5A.
Figure 5C:
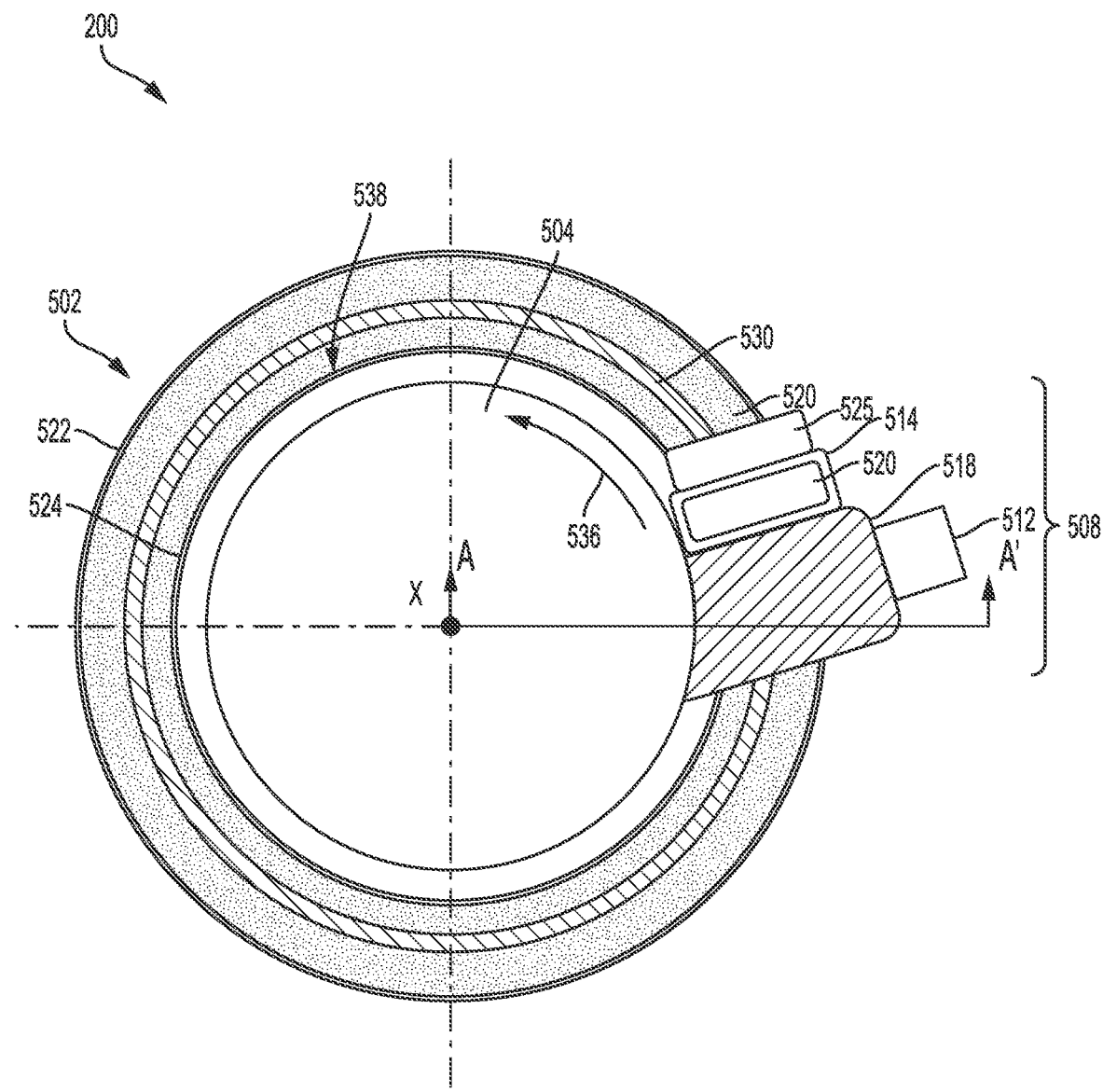
FIG. 5C is a schematic top view of the large-scale additive manufacturing apparatus of FIG. 5A.

FIGS. 5A-5C depict yet another additive manufacturing apparatus 500 in accordance with an embodiment of the present invention. In FIGS. 5A-5C, a build unit 508 may be attached to a rotating mechanism 538. FIG. 5A is a schematic front cross-sectional view of the additive manufacturing apparatus 500. The apparatus 500 includes an annular build platform 502 and the build unit 508. The annular build platform 502 has a non-rotating build plate 528, a circular inner wall 524 and a circular outer wall 522 with a diameter greater than the diameter of the inner wall 524. At the beginning of a powder-based additive manufacturing process, raw material powder may be deposited onto the build surface 542, that is, the top surface of the build platform 528. In the exemplary embodiment shown in FIG. 5A, the inner and outer walls 524, 522 of the annular build platform 502 each include a receptacle 526 to capture unfused powder spillover during production. The apparatus 500 includes the build unit 508 which has several components each serving different functions in a powder-based additive manufacturing process such as but not limited to selective laser melting (SLM), direct metal laser melting (DMLM) and electron beam melting (EBM). Components of the build unit 508 may be, for example, a powder delivery mechanism 514 (e.g. a hopper), an irradiation beam directing mechanism 512, a recoating mechanism 516 and a temperature control mechanism 525 (see FIGS. 5B and 5C). The recoating mechanism 516 may be a scraper, blade, squeegee, roller or the like. The apparatus 500 may be mounted on a support structure 532.

During an additive manufacturing process of the apparatus 500, the powder delivery mechanism 514 delivers and deposits a raw material powder 520 onto a powder bed of the build platform 502. The powder recoating mechanism 516 spreads and levels the deposited powder 520 into a substantially even powder layer. A portion of the substantially even powder layer (i.e. a build area) may then be melted by a laser or electron beam emitted by the irradiation beam directing mechanism 512 to form a fused, additive layer of the built object 530. The irradiation beam is indicated with a dashed line throughout the accompanying figures. The above-described manufacturing cycle may be repeated resulting in multiple layers being stacked to form the built object 530. Although FIG. 5C shows a single built object 530, it should be appreciated that the large-scale additive manufacturing apparatus 500 may be used to additively and simultaneously manufacture multiple smaller objects in the annular build platform 502.

The build unit 508 may be attached to a rotating mechanism 204 configured to rotate the build unit 508 around the rotational axis 510, 360°. In one exemplary embodiment, the build unit 508 may be directly attached to an area on the circumference 538 of the rotating mechanism 504. In an alternative embodiment, a support arm 518 emanates from the circumference of the rotating mechanism 504, upon which at least one of the powder delivery mechanism 514, the irradiation beam directing mechanism 512, the powder recoating mechanism 516 and the temperature control mechanism 525 may be mounted.

In FIG. 5B, the powder delivery mechanism 514 and the irradiation beam directing mechanism 512 may be secured to the support arm 518 while the powder recoating mechanism 516 attaches to the powder delivery mechanism 214, particularly at a bottom portion of the powder delivery mechanism 214 for dispensing the powder 520. The temperature control mechanism 525 may also be attached to the powder delivery mechanism 514 and away from the irradiation beam directing mechanism 512. According to an aspect, the present invention, for example, advantageously and strategically imposes some distance between the irradiation beam directing mechanism 512 and the temperature control mechanism 525 to ensure that the temperature control mechanism 525 measures the real-time temperature of a growing part of the built object (i.e. post-irradiation by the irradiation beam directing mechanism to form a fused layer and prior to cooling and solidification of the fused layer) instead of the melt pool. For instance, it may be desirable that the irradiation beam directing mechanism 512 and the temperature control mechanism 525 are at least 15 cm apart from each other, e.g. 15-60 cm, preferably 20-60 cm and 30-60 cm, more preferably 30-50 cm, 30-45 cm, 30-40 cm, 15-40 cm, 15-30 cm, 20-30 cm, 15-20 cm. Since the build unit 508 deposits, levels and melts the powder 520 in this particular order, it may be advantageous, for example, to arrange the related three components imparting these functions such that, in relation to the rotational direction indicated by the arrow 536 of the rotating mechanism 504, the powder delivery mechanism 514 precedes the powder recoating mechanism 516, which may then be followed by the irradiation beam directing mechanism 512.

According to an exemplary embodiment of the present invention, the rotating mechanism 504 may be a rigid structure having a cylindrical configuration as embodied in the accompanying figures. Alternatively, the rotating mechanism may be an annular, ring or doughnut configuration.

The build unit 508 may be attached to the rotating mechanism 504 as shown, for example, in FIG. 5A. The rotating mechanism 504 may be attached and supported onto a tower 506 via a connector 534. While the connector 534 may be described in FIG. 5A as a ball bearing positioned between an upper race and a lower race, it may be readily appreciated by persons skilled in the art that other types of suitable connectors may be used.

The tower 506 may be a vertically elongated structure that extends above the annular build platform 502. The tower 506, the rotating mechanism 504 and the annular build platform 502 may be concentric and have common center point X as indicated in FIG. 5C. Preferably, annular build platforms of various sizes may be arranged concentrically around any given tower and rotating mechanism. Generally, for example, the diameter of the powder bed may be greater than the diameter of the rotating mechanism and the width or diameter of the tower.

In certain embodiments, the apparatus 500 may incorporate features and elements disclosed in one or both of the Applicant's co-pending application Ser. No. 15/609,965 (Apparatus and method for continuous additive manufacturing) and Ser. No. 15/610,055 (Apparatus with large, stationary raw material supply mechanism and method for continuous additive manufacturing). Each of these applications is incorporated herein by reference in its entirety. For instance, the apparatus 500 may further include a central, large and stationary powder supply mechanism. The powder supply mechanism may be connected to the powder delivery mechanism, for example, via a feed chute that preferably rotates along with the rotating mechanism 504 in the same direction (e.g. direction indicated by the arrow 536). Preferably, the powder supply mechanism, the feed chute, the tower 506, the rotating mechanism 504 and the annular build platform 502 may be concentric, for example, at point X as shown in FIG. 5C. Use of a large stationary powder supply mechanism connected to the powder delivery mechanism 514 may be especially advantageous due to a reduction in weight of the powder 520 carried by the powder delivery mechanism and also the supporting arm 512, both of which rotate during production.

According to an aspect, an apparatus of the present invention may be encased within a build chamber. An atmosphere environment within the build chamber (i.e. the build environment or containment zone), may be controlled to have a reduction in the oxygen content relative to ambient air, and a reduced pressure in the environment. In some embodiments, the build environment defines an inert atmosphere (e.g., an argon atmosphere). In other embodiments, the build environment defines a reducing atmosphere to minimize oxidation. In yet other embodiments, the build environment defines a vacuum.

In accordance with the present invention, a temperature control mechanism may be configured to measure, determine and control a real-time temperature of a growing part of the built object. The temperature control mechanism may include a temperature sensor or similar device capable of performing the same such as, but not limited to, a pyrometer or a thermal imaging device. According to an aspect, a thermal imaging device may be utilized to not only measure the temperature of the growing part at a single point, but also measure the temperature of a substrate at multiple points to determine a temperature gradient along the growing part.

The temperature control mechanism may further include a controller, that is, a processor or computer device, that receives the measured growing part temperature as an analog or digital signal, processes the signal and compares the measured temperature to a predetermined reference temperature. The controller may then determine if any in situ adjustments in growth parameters (e.g., intensity, duration and/or speed of irradiation beam) are necessary.

According to an aspect, for example, a size of the geometry of the growing part in a given build layer may be adjusted larger or smaller to compensate for the real-time measured temperature compared to a first anticipated grow geometry of the part. Additionally, in yet another aspect, the build layer at which the part is built may also be adjusted. Adjusting the build layer may be useful for parts that may be tall in the grow direction and having the tendency to grow at undesired temperatures.

Figure 6:
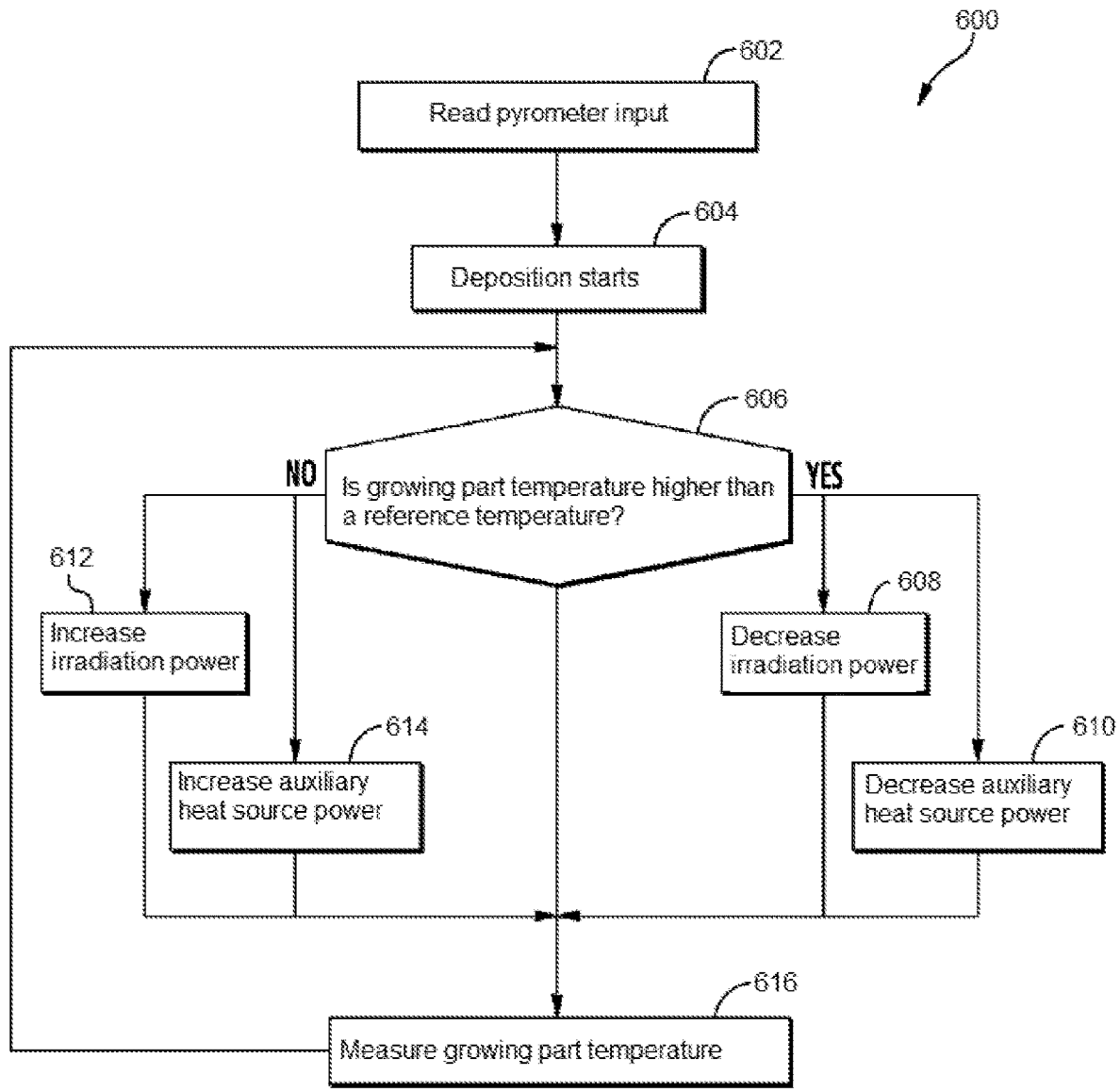
FIG. 6 is a flow chart of an algorithm for the temperature control mechanism according to one embodiment.

FIG. 6 shows an exemplary method 600 for use by a controller. At 602, the pyrometer input is read to determine the temperature of the melt pool. At 604, the powder deposition process starts. At 606, the growing part temperature may be compared to a predetermined reference temperature. If the growing part temperature is higher than the reference temperature, then a signal may be sent to the irradiation beam directing mechanism controller to decrease the laser or electron beam power at 608, to alter the scan parameters to reduce heat buildup, and/or to the auxiliary heat source controller (e.g., an auxiliary laser or electron beam power controller) to decrease the power of the auxiliary heat source (e.g., an auxiliary laser or electron beam) at 610. Conversely, if the growing point temperature is lower than the reference temperature, then a signal is sent to the irradiation beam directing mechanism controller to increase the laser or electron beam power at 612, to alter the scan parameters to increase heat buildup, and/or to the auxiliary heat source controller (e.g., an auxiliary laser or electron beam power controller) to increase the power of the auxiliary heat source (e.g., an auxiliary laser or electron beam) at 614. At 616, the growing part temperature is measured, and the process is repeated to the part is built. Thus, the growing part temperature may be controlled in real-time during deposition.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. An additive manufacturing apparatus for building an object, comprising:
   a powder dispenser;
   an irradiation source;
   a platform on which the object is built in a powder bed;
   a recoater providing layers of powder over the platform; and
   a controller configured to measure a real-time temperature of a portion of the object after irradiation and prior to solidification of the portion, as the object is built,
   wherein the controller is configured to calculate a real-time part size based on the real-time temperature measurement; and
   wherein the controller is configured to adjust a dimension of a geometry of the object in a subsequent build layer based on the real-time temperature measurement.

2. The apparatus of claim 1, wherein the controller is configured to measure a thermal state of the powder bed.

3. The apparatus of claim 1, further comprising a temperature sensor configured to measure the real-time temperature of the portion of the object.

4. The apparatus of claim 1, wherein the controller is configured to control an increase or decrease in beam power emitted by the irradiation source based on the real-time temperature measurement.

5. The apparatus of claim 1, wherein the controller is configured to adjust a grow parameter of the object based on the real-time part size.

6. The apparatus of claim 1, wherein the controller is configured to adjust a subsequent build layer based on the real-time temperature measurement.

7. An additive manufacturing apparatus for building an object, comprising:
- a build unit including a powder delivery mechanism, a recoater, an irradiation source and a temperature control mechanism configured to measure a real-time temperature of a portion of the object after irradiation and prior to solidification of the portion, as the object is built;
- a build platform;
- a rotating mechanism attached to the build unit and capable of rotating about a center axis thereof relative to the build unit,
- wherein the temperature control mechanism is configured to calculate a real-time part size based on the real-time temperature measurement; and
- wherein the temperature control mechanism is configured to adjust a dimension of a geometry of the object based on the real-time temperature measurement.

8. The apparatus of claim 7, wherein the build platform is annular.

9. The apparatus of claim 7, further comprising a tower to support the rotating mechanism.

10. The apparatus of claim 9, wherein the build platform, the rotating mechanism and the tower are concentric.

11. The apparatus of claim 7, wherein the temperature control mechanism comprises a temperature sensor.

12. The apparatus of claim 7, wherein the temperature control mechanism is configured to control an increase or decrease in beam power emitted by the irradiation source based on the real-time temperature measurement.

13. The apparatus of claim 7, wherein the build unit moves in a circular path about the center axis of the rotating mechanism.

14. The apparatus of claim 7, wherein the build platform is capable of rotating about a center axis thereof.

15. The apparatus of claim 7, further comprising a positioning mechanism configured to provide independent movement of the build unit in at least two directions substantially parallel to the build platform.

16. A method of manufacturing an object, comprising:
- (a) depositing a layer of powder onto a build platform in a powder bed;
- (b) fusing the layer of powder in the powder bed to form a portion of the object;
- (c) measuring a real-time temperature of the portion of the object after irradiation and prior to solidification of the portion, as the object is being built;
- (d) based on the real-time temperature measurement, calculating real-time part size and adjusting a dimension of a geometry of the object in a subsequent build layer;
- (e) depositing a subsequent layer of powder; and
- (f) repeating steps (a) through (e) until the object is formed in the powder bed.

17. The method of claim 16, comprising comparing the real-time temperature measurement to a predetermined reference temperature.

18. The method of claim 17, comprising controlling the fusing of the subsequent build layer based on the real-time temperature measurement.

19. The method of claim 16, comprising adjusting a size of the geometry of the object in the subsequent build layer based on the real-time part size.

20. The method of claim 16, comprising adjusting a subsequent build layer based on the real-time temperature measurement.

* * * * *